No. 751,162. PATENTED FEB. 2, 1904.
J. GELL.
PERFORATOR FOR AUTOMATIC TELEGRAPH TRANSMITTERS.
APPLICATION FILED DEC. 12, 1902.
NO MODEL. 6 SHEETS—SHEET 2.
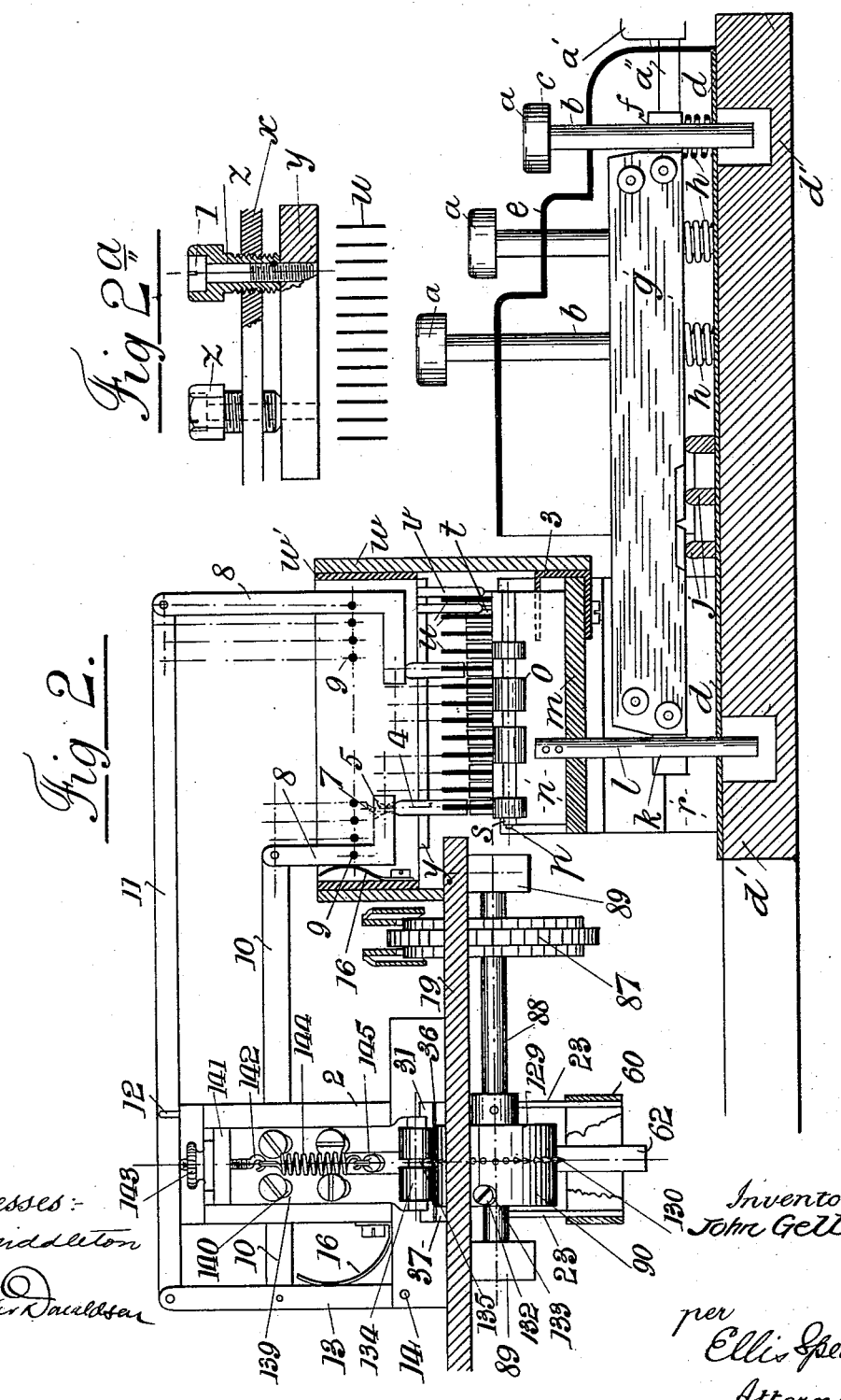

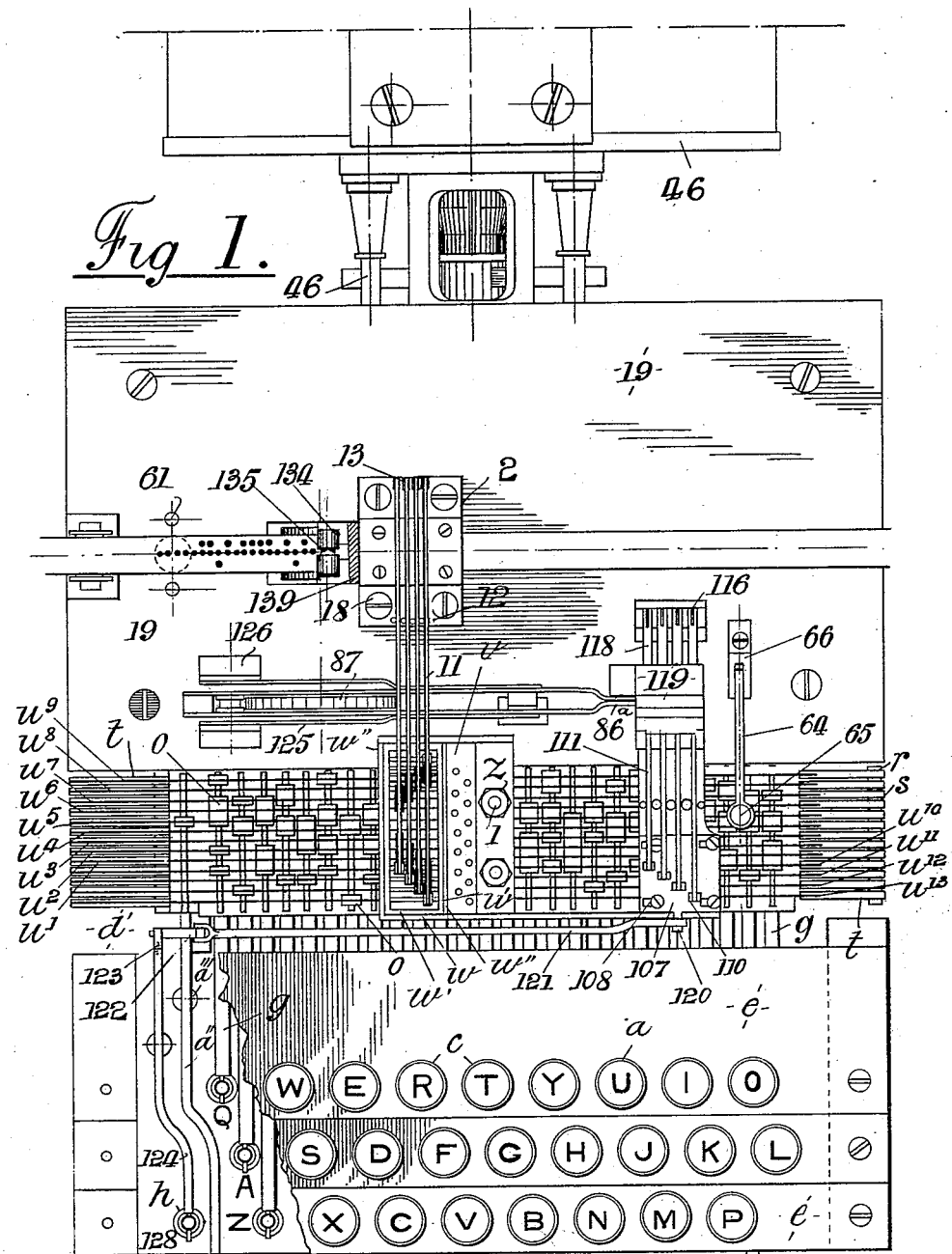

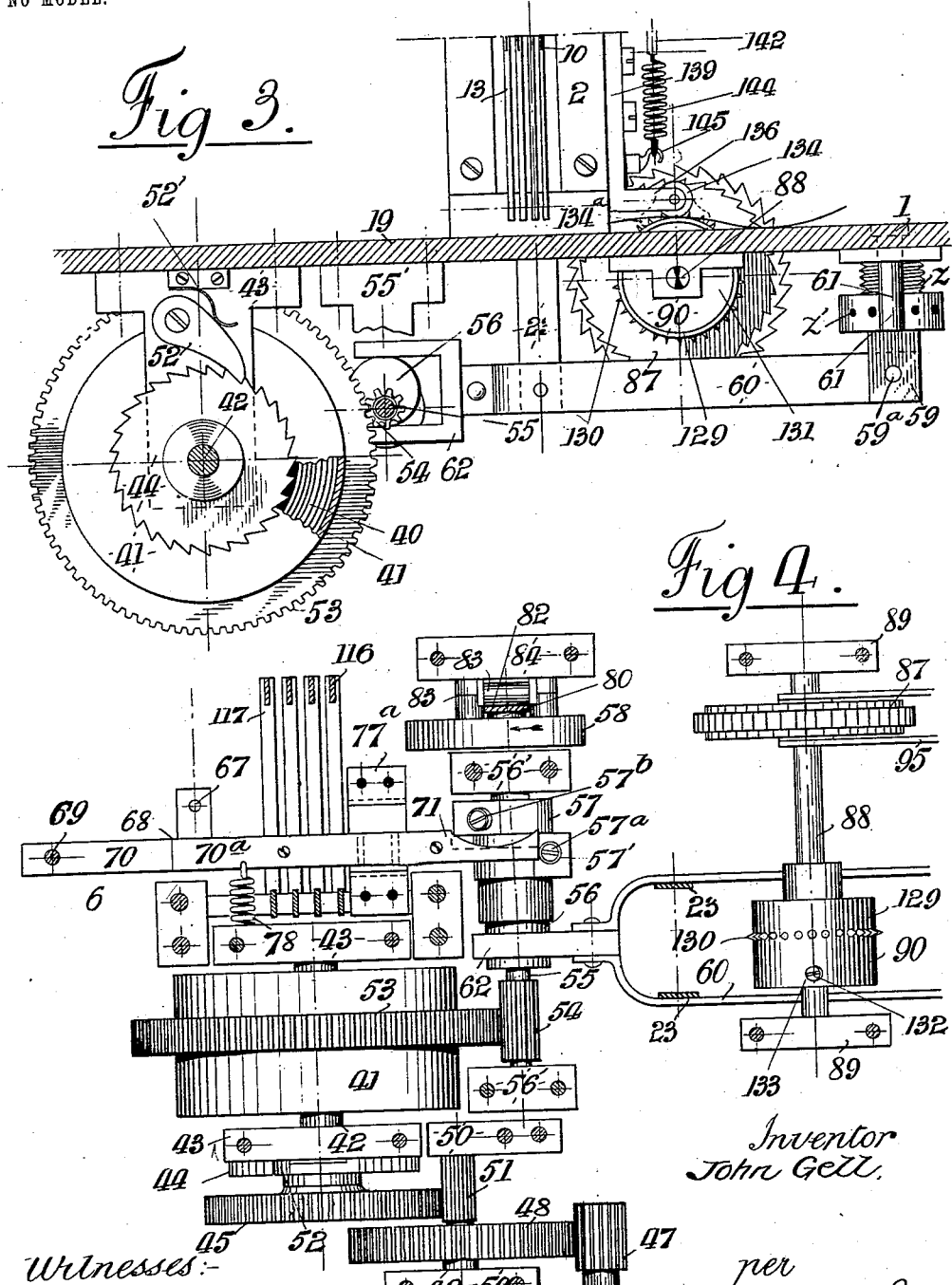

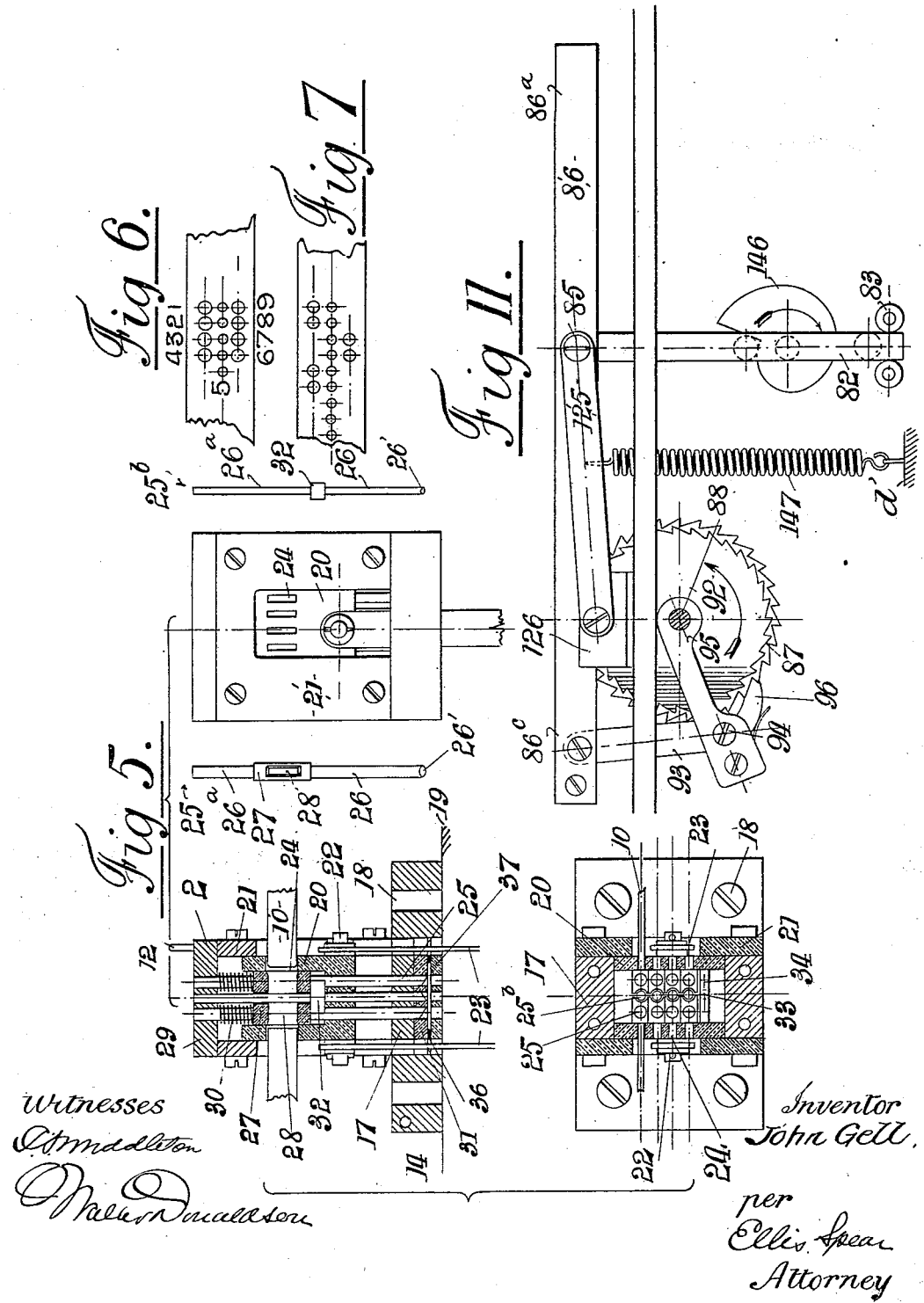

No. 751,162. PATENTED FEB. 2, 1904.
J. GELL.
PERFORATOR FOR AUTOMATIC TELEGRAPH TRANSMITTERS.
APPLICATION FILED DEC. 12, 1902.
NO MODEL. 6 SHEETS—SHEET 5.
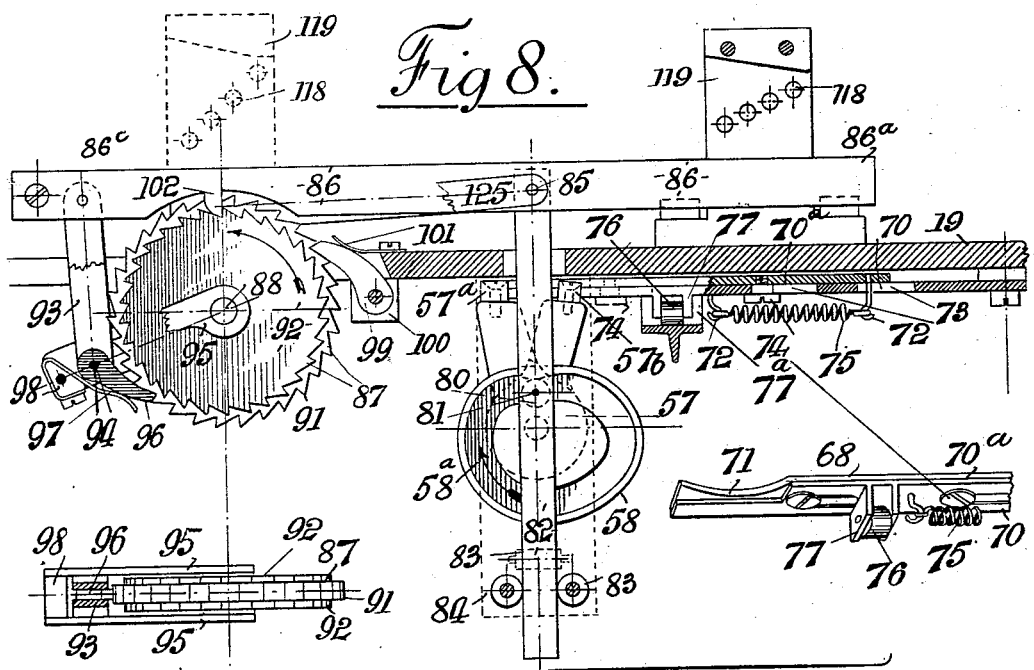
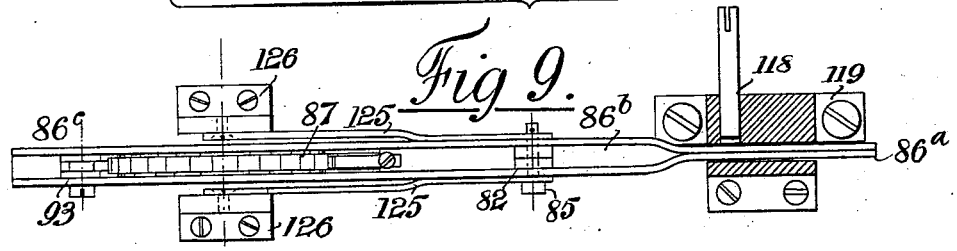
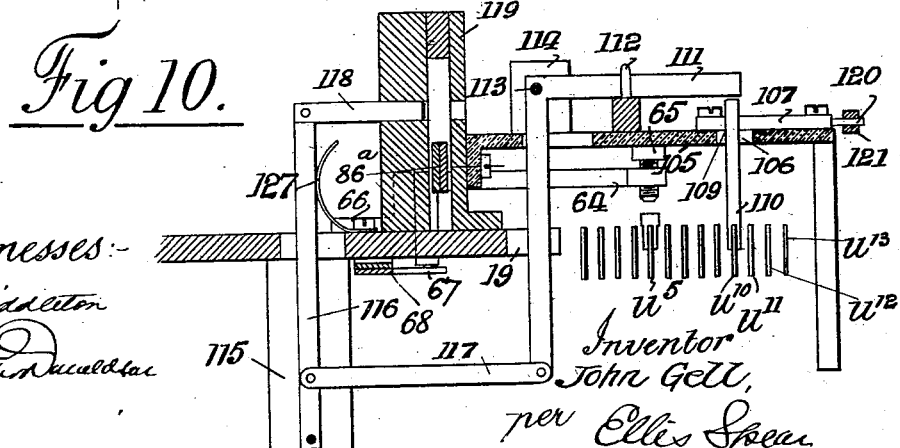
Witnesses:—
Inventor
John Gell,
per Ellis Spear.
Attorney No. 751,162. PATENTED FEB. 2, 1904.
J. GELL.
PERFORATOR FOR AUTOMATIC TELEGRAPH TRANSMITTERS.
APPLICATION FILED DEC. 12, 1902.
NO MODEL. 6 SHEETS—SHEET 6.
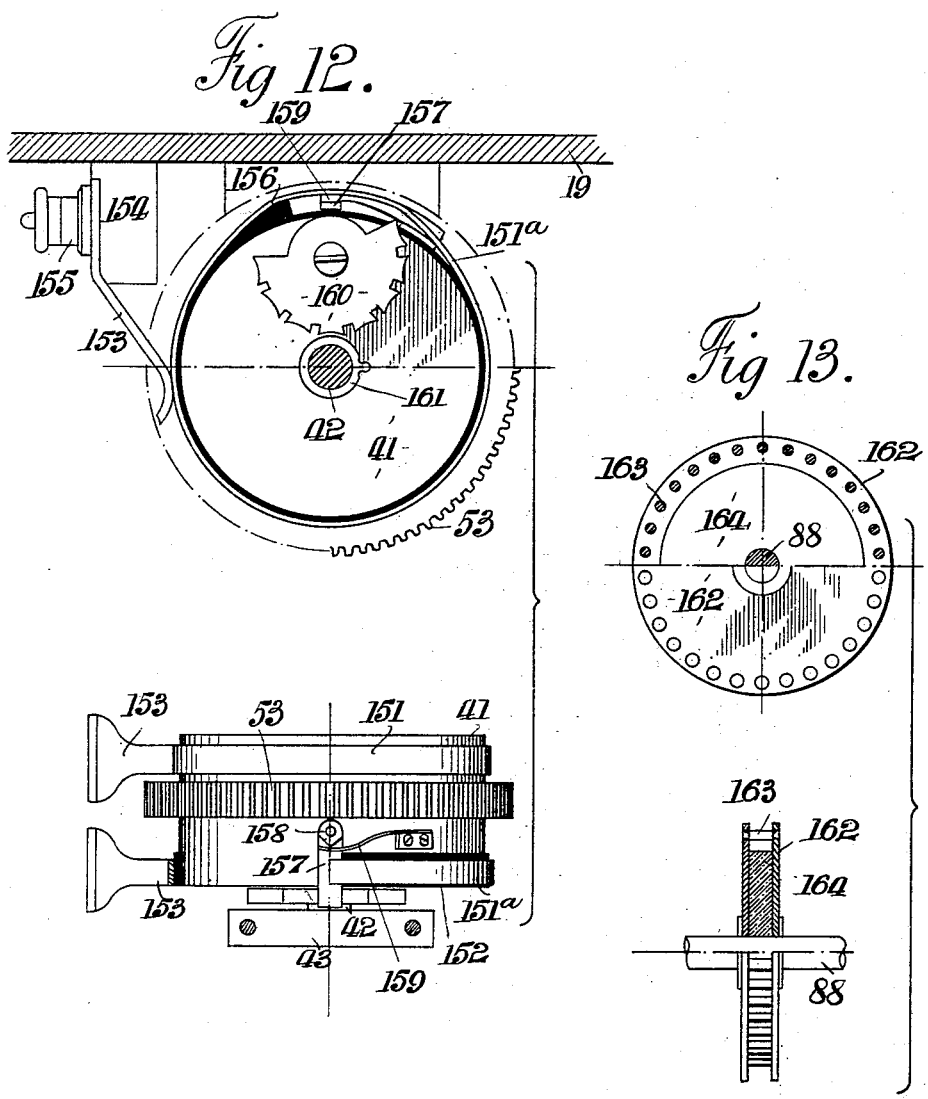
Witnesses
Inventor
John Gell,
per
Ellis Spear
Attorney No. 751,162.

Patented February 2, 1904.

UNITED STATES PATENT OFFICE.

JOHN GELL, OF LONDON, ENGLAND.

PERFORATOR FOR AUTOMATIC TELEGRAPH-TRANSMITTERS.

SPECIFICATION forming part of Letters Patent No. 751,162, dated February 2, 1904.

Application filed December 12, 1902. Serial No. 134,997. (No model.)

*To all whom it may concern:*

Be it known that I, JOHN GELL, electrical engineer, a subject of the King of Great Britain, residing at 48 Highbury Hill, London, N., in the county of Middlesex, England, have invented certain new and useful Improvements in Perforators More Particularly for Use with Automatic Telegraph-Transmitters; and I do hereby declare the following to be a full, clear, and exact description of the invention, such as will enable others skilled in the art to which it appertains to make and use the same.

My invention consists in improvements on the invention shown in my previous application for Letters Patent, Serial No. 129,879, and has reference more particularly to the differential feeding-gear, means for driving and release, and various supplementary devices. The key-action punch and means for selecting punches while being described are not claimed, as same are embodied in my above-mentioned application.

My invention consists in improvements in perforators, and relates to apparatus whereby symbols or the like are perforated in a length of paper or other tape upon the depression of a key. It is, however, more particularly applicable for the purpose of perforating the paper or like tape used for Wheatstone or other automatic telegraph-transmitters.

I will now proceed to describe my invention more particularly, reference being made to the accompanying drawings, in which—

Figure 1 is a plan. Fig. 2 is a part-sectional side elevation of Fig. 1 to larger scale. Fig. 2ª shows detail of adjustable bushes. Fig. 3 is a part-sectional back view of the spring, cam, and feed-shafts. Fig. 4 is a plan of driving-gear, cam, and feed-shafts, the platform being removed. Fig. 5 shows detail of punch, the perforating-needles for the sake of clearness being slightly enlarged. Fig. 6 shows numerically the whole of the integers from which the telegraphic symbols are selected. Fig. 7 shows in telegraphic symbols the interrogation-mark combination. Fig. 8 shows detail of cam-action and tape-feeding mechanism. Fig. 9 is a part plan of Fig. 8. Fig. 10 shows detail of stop-pins, guide, and actuating-levers. Fig. 11 shows modification of Fig. 8. Fig. 12 shows detail of automatic switch. Fig. 13 shows modification of ratchet-wheel.

In the following specification I have described my invention as perforating the paper strip usually employed in transmitters for submarine telegraphy. A slight modification adapts the same apparatus for use with land-line transmitters.

Similar letters refer to similar parts in all the views, and functional mechanism, such as the punch and escapement-lever, consisting of many parts, have been designated by one character or numeral when referred to as a whole.

In the drawings, *a* represents the keys, preferably similar in pattern to those employed in standard type-writers. Each of these consists of a shank *b*, covered by an indexed button on head *c*, said shank taking a guide through a brass plate *d*, screwed to the base-board *d'* of the machine at its lower part and through the cover-plate *e* at its upper end. At the point shown in Fig. 2 the shank *b* has a slot *f* cut in it, and into this slot is placed the front steel tail of the key-lever *g*. A compressible spring *h* surrounds the key-shank *b* between the base-plate *d* and the steel tail of key-lever *g*. The key-levers are pivoted at a given point in their length by resting on fulcrum-bars *j*, (see Fig. 2,) each row of keys being so pivoted as that the terminal lift is the same on each key-lever. The key-levers are preferably made of wood having steel tails riveted at their front and back ends, the back tails of said key-levers being passed into a slot *k*, formed in the length of the vertical rods *l*, which also are guided by passing through base-plate *d* and upper guide-plate *m* and have riveted and soldered at their upper extremity plates *n*, these plates having small rollers *o* or projections arranged and spaced along their length according to the number of elements composing the telegraphic symbol and the character of the key to which each is respectively connected. The roller-plates *n* are formed by bending a thin piece of metal over a former, a piece of wire *p* being inserted at the bend. This is subsequently withdrawn, notches cut out according to the position and number of rollers same is intended to carry. The rollers $o$ are then inserted and the pin replaced. The upper guide-plate $m$ is secured to side bearers $r$, having a notched extension $s$, which carry a plurality of pivoted links $t$, to the other end of which are pivoted the ends of the parallel bars $u$, normally resting upon the rollers $o$. These parallel bars $u$ are so mounted as that any vertical movement of the roller-plate $n$ gives a vertical motion to the parallel bars. Said parallel bars $u$, although grouped together, may be divided into two classes, each class having its particular function, the one translating the characters on the keys into code, the other determining the amount of feed required by the tape for its corresponding telegraphic symbol and for spacing. For submarine-cable code these bars are thirteen in number, eight being employed for perforating, one for the escapement release of the punching and feeding mechanism, and four for the differential feed. The parallel bars $u$ are guided by means of a comb $v$, bridged across them and attached to the plates $w\ w'$ of the punch-link pivot-cradle. Contiguous to this comb $v$ and hung from a plate $x$, supported in the same manner, is the check-piece $y$ for limiting the excessive upward travel of the parallel bars $u$. Through the plate $x$ are screwed adjusting-bushes $z$, through which are passed screws 1, threaded into the check-piece $y$, the advantage of this being that while the check-piece is rigidly held by the screws 1 its relative height with regard to the parallel bars $u$ can be set to a nicety by means of the adjustable bushes $z$. (See Figs. 1 and $2^a$.)

In a line with the punch 2 and bridging the parallel bars is the cradle containing the pivots for the punch-levers. It is built up box fashion of metal plates $w'$, the ends of the pivots passing through plate $w'$ at either side and kept in their place by a cover-plate $w''$. The cradle is secured to a stiff plate $w$ in front, which is fastened to a metallic U-piece 3, attached to the upper guide-plate $m$, said U-piece being slotted for the purpose of forming a comb for the roller-plates $n$. (See Fig. 2.) Hinged to parallel bars $u'\ u^2\ u^3\ u^4\ u^6\ u^7\ u^8\ u^9$ are links 4, having pins 5 at their extremity which engage with conical holes 7 in the limbs of bell-cranks 8, pivoted between the plates of the cradle on pins or pivots 9. Bell-cranks in connection with parallel bars $u^6\ u^7\ u^8\ u^9$ are hinged to interlocking pins 10 and bell-cranks in connection with parallel bars $u'\ u^2\ u^3\ u^4$ are hinged to connecting-rods 11, passing over the top of the punch 2 through pin-comb 12, which are pivoted to upright levers 13, hinged by a pin 14 to base of punch 2. At a point in the length of these upright levers 13 is pivoted another set of interlocking pins 10, which enter the punch on the opposite side to the others, but at the same level. Light springs 16 are placed on the one side against the upright levers 13 and on the other side against the bell-cranks 8 to overcome friction and to assist in the disengagement of the interlocking pins when the finger is removed from the key. (See Figs. 1 and 2.)

The punch 2 (see Fig. 5) consists of a shell 17, screwed at 18 to the metallic platform 19. Within the shell 17 is a U-shaped slider 20, guide-plates 21 keeping same in position. This slider has projecting pins 22, to which are attached the reciprocating pitmen 23. In the upper part of the slider are four slots 24, cut on either side and into which the interlocking pins 10 at normal position just pass. Through the base of the U-piece pass the punches or perforating-needles 25. These are of two kinds—those for marking holes and those for the corresponding necessary spacing or feed holes. (See Figs. 5, 6, 7.) All the punches or perforating-needles 25 are formed with a bottom shank 26, the end of which, 26', is cut obliquely chisel fashion for more easily penetrating the paper, and a top shank $26^a$. The marking-punches have an intermediate swell 27, in which is pierced an eye 28, so arranged as that same shall come when the punch is at rest opposite the corresponding slot in the U-slider 20. The upper shanks $26^a$ pass through a top guide-plate of steel 29, screwed into punch-shell 17, an expanding-spring 30 being placed between the top guide-plate 29 and swell 27, surrounding each of the shanks $26^a$, or I may replace spring 30 by a check-piece to limit the upward travel of punches 25. At the base they pass through the guide-plate 31, attached to the shell 17. The spacing or feed-hole punches $25^b$ are also formed with the lower and upper shank 26 $26^a$, respectively, but have shoulders 32 placed in their length, which come beneath the swells 27 of the marking-hole punches. Hence the marking-hole punches from either side on depression will carry down their respective feed-hole punches. The leading spacing-hole punch 33 is either fixed in the slider by screwing or brazing or placed beneath a cross-bar 34, as shown in plan at Fig. 5. All the punches are guided near the point of penetration by passing through the shell 17 and guide-plate 31 attached thereto. Underneath the bottom guide-plate 31 and separated from the same by distance-pieces 36 is the cutting-die plate 37, the holes in which are in register with the guide-plate 31 immediately above and slightly chamfered outwardly for clearance of chips. I have now described the key action, translating-bars, and punch and will pass on to the driving-escapement, perforating, and feeding mechanisms.

*Driving.*—A large steel spring 40 (see Figs. 3 and 4) is coiled within a spring box or barrel 41, one end of said spring being attached to the inner circumference of spring-box 41 and the other to the shaft 42, said shaft being supported at either end by means of bearings 43, screwed to the under side of platform 19 and having a ratchet-wheel 44 and spur-wheel 45 mounted on its rear extremity. The spring 40 is wound up by means of a motor 46, (see Fig. 1,) whose speed is specially proportioned to requirement, having at the end of its armature-shaft, supported by bearing 46ª, a pinion 47, which drives a spur-wheel 48, mounted on a shaft 49, supported in bearings 50 and carrying a spur-pinion 51, engaging with the spur-wheel on the spring-shaft 42. A pawl 52, pressed into engagement by spring 52', engages with the teeth of the ratchet-wheel 44 (see Fig. 3) and prevents the spring uncoiling.

On the outer circumference of the spring-box 41 is a spur-toothed ring 53, which engages with the spur-pinion 54, forming part of or secured to the cam-shaft 55, which shaft is mounted in bearings 55', secured to the under side of platform 19, and carries an eccentric 56, escapement stagger-pins 57ª 57ᵇ, and at its front extremity the cam 58.

Hinged to a block 59 by means of a pin 59ª is a rocking frame 60. (See Fig. 3.) This block is upheld by means of a screw 1, passing through an adjustable bush z, screwed into platform 19, which latter is thickened on the under side to give the bush a better hold. By this means the relative height of the rocking frame 60 with regard to the punch may be easily adjusted, for which purpose the head of the bush z is formed with tommy-holes z'. By putting the bush beneath the platform an unobstructed tape-race is obtained, the block 59 being prevented from turning by means of steady-pins 61, entering the platform 19 on either side. The rocking frame 60 has pivoted to it at the points shown the reciprocating pitmen 23, attached to the U-shaped slider 20 (see Fig. 5) of the punch 2, and said frame terminates with a forked extremity 62, which girdles and forms a rolling path for the eccentric 56 on cam-shaft 55.

*Escapement.*—Over one of the parallel bars u⁵, which is operated by the spacing-bar and by every key depressed, is a cranked lever 64, (see Figs. 1 and 10,) provided with a set-screw 65, which engages with said parallel bar. This cranked lever is hinged to a cock 66, screwed to the platform 19, and its lower limb terminates in a pin which engages with a hole 67, formed in an extension of the escapement-lever 68. This escapement-lever is pivoted at 69 (see Fig. 4) to the under side of the platform 19 and normally prevents the cam-shaft 55 from rotation by contact with stagger-pin 57ª. These stagger-pins are mounted on extensions of the barrel 57 and consist of rollers 57', through which passes a screw.

The escapement-lever 68 (see Figs. 4 and 8) is composed of two parts, the main or pivoted part 70 being beneath the upper or sliding part 70ª. This latter part is so designed as that its travel over the main part is slightly less than the distance between the stagger-pin centers on the periphery of the escapement-barrel 57 and is formed at its one extremity with a curved tooth 71 and at its other with a spring-hook 72, passing through a slot 73 in the lower portion 70. It is secured to the lower portion by means of headed screws 74, also passing through slots 73, formed therein and which permit of its lateral movement. The lower part is provided with a spring-hook 72, a contractile spring 75 being hung thereon, its other end being attached to the hook 72, secured to the upper or sliding portion 70ª. A roller 76, mounted in cheeks 77, formed on the lower part 69, travels in a horizontal plane over a bridge 77ª, secured to the under side of platform 19, and thereby relieves the escapement-lever and pivot of weight. On depressing a key or the spacing-bar the end of the main escapement-lever 70 is drawn aside from stagger-pin 57ª (see Fig. 4) and the curved but flat-ended tooth 71 passes behind the second stagger-pin 57ᵇ. Immediately the first-stagger-pin 57ª is clear of the main escapement-lever 70 the cam-shaft revolves, but is arrested when the second stagger-pin 57ᵇ strikes the sliding tooth 71, which absorbs the shock by being pushed back against the effort of contractile spring 75. The end of the main escapement-lever is now but a very short distance behind the first stagger-pin 57ª. Hence on lifting the finger the shaft only very partially rotates before the end of the escapement-lever 70 being pulled back by the effort of contractile spring 78, attached to it, and cock 43 engages with the first or stop stagger-pin 57ª.

*Perforating.*—The eccentric 56 is so mounted with regard to the cam 58 as that perforation shall take place during the first part of the shaft's revolution, for the tape having been punched and the punches or perforating-needles withdrawn the required feed is imparted to the tape, depending upon the length of symbol, leaving it ready for the next perforation. The tape-feed is accomplished in the following manner: As previously stated, the cam or main shaft 55 carries a grooved snail-cam 58, mounted at its extremity. (See Fig. 8.) Traveling in this cam-groove 58ª is a roller 80, pinned by a screw 81 to a vertically-reciprocating rod 82, traveling in a guide formed of rollers 83, pinned to a cock 84, screwed to the under side of platform 19. The upper end of this rod is pivoted by a pin 85 to the middle portion of a beam 86, (see Fig. 9,) composed of two parallel members riveted together, but so made as that one end 86ª forms a solid tail, the two members being then bent so as to leave a parallel channel 86ᵇ and secured together by a screw passing through a distance-piece at the other end or head 86ᶜ, (see Fig. 9,) the beam thus formed lying at right angles to the main shaft-carrying cam. On rotation of the cam this beam rises and falls where attached to the vertical rod 82 a certain fixed and equal distance every time. The upward travel of the beam-head $86^c$, however, will depend upon the position in which the beam-tail $86^a$, which rises first, is arrested. Immediately beneath the channel $86^b$ between the beam members is a compound ratchet-wheel, which when referred to as a whole I will designate under number 87. It is mounted on an independent feed-shaft 88, revolving in brackets 89, screwed to the under side of the platform 19. This same feed-shaft also carries on its length the sprocketed star feed-wheel 90, (see Fig. 4,) mounted below and a little in advance of the punch 2. The compound ratchet-wheel 87 is composed of a main ratchet-toothed disk 91, to which are attached, one on either side, two other ratchet-toothed disks 92, the teeth in which latter are cut in the reverse direction to the main ratchet-disk 91. Depending from the beam-head $86^c$, pivoted between its members, are drag-links 93, which at their other end are pinned at 94 to two radius-arms 95, whose reverse ends are mounted upon the feed-shaft 88, one on either side of the compound ratchet-wheel 87. Hinged on the pin 94 between the radius-arms 95 is a pawl 96, a spring 97, screwed to the radius-arms-distancing piece 98, pressing same into engagement with the main ratchet-wheel 91. This is the driving-pawl. A check-pawl 99, pivoted in cocks 100, screwed to platform 19 and pressed into engagement by a spring 101, prevents any backward rotation of the ratchet-wheel 87. The beam members 86 each have a tooth 102 cut in their substance engaging with the side ratchet-wheels 92. Over the feed parallel bars $u^{10}$ $u^{11}$ $u^{12}$ $u^{13}$ (see Fig. 10) is mounted a table 105, having slots 106, upon which slides a comb-plate 107, having screw guide-slots 108 and rod-holes 109. (See Fig. 1.) Jockeyed to these parallel bars are the feed push-rods 110, (see also Fig. 10,) which engage, when one of the bars is lifted, with its respective cranked lever 111, all which latter pass through pin-comb 112 and are pivoted by a pin 113 to cocks 114. Mounted in cocks 115 beneath the platform are four levers 116, connecting-rods 117 linking these with the lower ends of cranked levers 111. The levers 116 have pivoted to their upper ends stop-pins 118, sliding in an arched guide 119, through which the tail of beam $86^a$ passes. The sliding comb-plate 107 has a projecting pin 120, to which is attached one end of a connecting-rod 121, pivoted at its other end to a hinged bell-crank 122, the lower limb of which bell-crank works in a fork 123, (see Fig. 1,) formed in the end of the limiting-key lever 124. The spacing-key $a'$ on levers $a''$ is pivoted to a cock $a'''$ and actuates the parallel bar $u^5$ by roller $o$ on depression. This causes the shaft to revolve and draw down the punch-slider, carrying with it the feed-hole-spacing punch, perforating the paper. The operation of this feeding mechanism is as follows: The cam-shaft being released by the escapement on depression of a key, the cam 58 revolves, lifting the beam 86 by means of vertical rod 82. The tail of the beam $86^a$ rises first until it comes into engagement with one of the stop-pins 118, which is pushed across the arch on depressing the key by means of the levers and links already described. The beam-tail can now rise no higher, its point of contact with the stop-pin acting as a fulcrum, the upward travel of the vertical rod 82 lifting the head to a height according to the position of the stop-pins, which latter are ranged in echelon in the guide 119 and represent the feed values of the symbols composing the code. The beam-head in rising draws the pawl 96 between the radius-arms 95 over the teeth of the main ratchet-wheel and lifts the teeth 102 out of engagement with the side ratchet-wheels. To insure the beam lifting and pivoting properly, radius-links 125, (see Fig. 11,) one on either side of the beam, are pivoted to cocks 126, mounted centrally on the platform 19 with regard to the ratchet feed-wheel 87, their other ends being hung on the pin 85. (See Figs. 8 and 9.) The cam in drawing down the beam imparts the required feed to the ratchet-wheel 87, which drives the sprocketed star feed-wheel 90 on the same shaft forward, its star-points engaging with the feed-holes punched in the paper tape. At the end of the movement the teeth on the beam members engage with the side ratchet-wheels and prevent the momentum giving additional feed. As a means for preventing the beam-head from rising too high from wear and overfeeding I may duplicate the stop-pin arrangement over the beam-head, as shown in dotted lines. (See Fig. 8.) To replace the stop-pins within the guide-blocks, I provide a spring 127, (see Fig. 10,) which throws them out of engagement when the finger is removed from the key. When the stop-pin arrangement is duplicated, the least rise of the beam will represent the least feed. When, however, the limiting-key is used, the push-rods will be moved so that the spacing-feed now on this side is eliminated. Since the one space-feed is only required by the spacing-bar, however, I fix a pin actuating the one feed stop-pin on the spacing-lever roller-plate.

To enable the sprocketed star feed-wheel to be adjusted for absolute register with the tape-feed holes, I form the periphery from a brass ring 129, (see Figs. 2, 3, and 4,) and in this I fix the star-pegs 130. The ring is secured to a solid center piece 131, fast on shaft by means of countersunk screws 132, which pass through a slightly-elongated slot 133, formed in the brass ring 129. In engagement with the sprocketed star feed-wheel thus formed is a top roller 134, (see Figs. 1, 2, and 3,) grooved at 135 to clear the star-pegs 130. It is mounted in a cock 136, forming part of a plate 139, screwed to punch 2 through elongated slots 140, having at the top a ledge 141, through which is passed a threaded spring-hook 142, having adjusting-nut 143, one end of a contractile spring 144 being hung on said hook, its other end being hung on a stud 145, screwed to punch 2, passing through plate 139. By this means a tension is secured upon the top roller 134. To cause the tape to engage with more than one star-pin on the feed-wheel, I may replace the top roller 134 by a pivoted shoe 134ª. (See dotted lines, Fig. 3.)

The operation of my invention is as follows: Upon depressing a key it elevates through its respective lever $g$ and roller-plate $n$ the predetermined parallel bars, the character-bars of which forming the telegraphic symbol cause the interlocking pins or bars 10 to engage with the eyes in the upper part of the required punches or perforating-needles. A stop-pin 118, depending upon the key struck, is also inserted through the guide and the feed thus set, the escapement-lever being released at the same time, allowing the main or cam shaft 55, with eccentric 56, to revolve, and thereby depress the slider 20, causing the punches to perforate the paper or like tape beneath them. The eccentric continues to revolve and lifts the punches clear of the tape. When it is desired to eliminate the spacing feed-hole between two symbols, so as to form symbolic figures, punctuation-marks, or arbitrary signs, the limiting-key 128 is depressed, moving the comb plate or plates 107 so as to advance the push-rods 110 under the cranked levers one up, thereby causing the tape to be fed one element less. Hence the succeeding symbol will commence over the ordinary spacing-hole, eliminating it from view.

In Fig. 11 I have shown a modified form of cam 146. This is formed without a groove and is of the snail pattern. The alinement of the beam is insured by means of the radius-rods 125 and stop-pin guides 119, the contractile-spring 147, attached to the beam and base $d'$, drawing down the beam and feeding the tape.

When my perforator is driven by an electromotor, I provide an automatic switch for regulating the same. It is constructed as follows: Upon the periphery of the spring-barrel 41 (see Fig. 12) I place two brass, copper, or other metallic rings 151 151ª, 151ª being insulated by a ring of vulcanite or equivalent 152. Two contact-scrubbers 153 engage with these rings, each being connected to an insulated block 154, provided with terminals 155. The ring 151ª is looped at 156, and beneath this loop and pivoted to the spring-barrel 41 is the switch-tongue 157. This has a triangular-shaped boss 158, with the apex of which at normal conditions engages the spring 159, screwed to the spring-barrel 41. Screw-pinned to the rear side of said spring-barrel is a mutilated segment-wheel 160, engaging with a single toothed ring 161, fast on the shaft 42. Should the spring have run down, then the shoulder of the segment-wheel engages with the switch-tongue 157, which immediately flies over and engages with the brass ring 151ª, completing the circuit and starting the motor. The shaft 42 now revolves, carrying round with it the one-toothed ring, which revolving slightly in excess of the spring-drum rotates the segment-wheel until the reversed shoulder on this latter disengages the switch-tongue 157, restoring the same to its normal position.

In Fig. 13 I have shown a modified form of ratchet-feed wheel 87 to be used in place of the reversed tooth feed-wheel, as shown in Figs. 8 and 9. It is built lantern-wheel fashion, the disks 162 having rods 163 riveted across them so as to form a wheel capable of being driven forward by pawl 96 (see Fig. 8) and locked by the beam-teeth which engage with the pin-teeth. Between the two disks is a distance-piece 164 of such a radius that it also acts as a stop-check to prevent teeth of pawls engaging too deeply.

It will be understood that while I have shown the interlocking pins as normally out of connection with the punches and arranged to be thrust into connection therewith to select the same I do not wish to limit myself to this arrangement, though I prefer it, it being possible to reverse the arrangement by having the interlocking pins normally engage the punches and withdraw those not needed in selecting the punches.

I claim—

1. In a mechanical perforator for use with automatic telegraph-transmitters having a character-keyboard, translating mechanism and punch, the combination of a spring-driven shaft, operating means for releasing said shaft and perforating the tape, a feed controlling and setting device, and means for driving a separate shaft to feed said tape in accordance with the length of symbol perforated, substantially as described.

2. In a mechanical perforator for use with automatic telegraph-transmitters fitted with a character-keyboard, translating mechanism and punch; the combination of a barrel with spring attached thereto and directly to the axle operated by a motor through gearing, a spur-ring mounted on said barrel driving by a pinion an independent shaft carrying roller-faced stagger-pins, the pivoted escapement-lever engaging with said stagger-pins and thus allowing the shaft to revolve in such manner as to perforate the tape as required, a cam fast on end of said shaft actuating by vertical rods a rising and falling beam, imparting by means of a swinging pawl, the necessary feed to an independent tape-feed shaft substantially as described.

3. In combination with a mechanical perforator for use with automatic telegraph-transmitters, of a separate feed-shaft carrying a compound ratchet-wheel with reversed teeth and sprocketed star feed-wheel means for driving said shaft in accordance with the length of symbol and locking same when at rest substantially as described.

4. In combination with a mechanical perforator for use with automatic telegraph-transmitters, a rising and falling beam alined by radius-links as described, and operated by a cam-driven reciprocating rod, means for arresting the upward travel of said beam-tail consisting of stop-pins actuated by levers from the feed parallel bars whereby the requisite amount of feed is imparted to an independent shaft driven by a swinging pawl engaging with a compound ratchet-wheel fast on said shaft substantially as herein described.

5. In a perforator for use with automatic transmitters the combination of a stagger-pin barrel on main or cam shaft coöperating with a pivoted compound escapement-lever formed with a sliding tooth so that the shaft is arrested and cushioned against the effort of a spring interposed between the two elements of escapement-lever.

6. In combination in a mechanical perforator tape-feed mechanism, punching mechanism, a compound escapement-lever consisting of upper and lower parts, a series of parallel bars, a pivoted lever operated by one of the parallel bars, keys operating the parallel bars, a cam-shaft, stagger-pins thereon arranged to be engaged by the escapement-lever, the upper part of the compound lever sliding over the lower part and a contractile spring associated with the compound lever for applying a yielding pressure to the upper part of the compound lever, substantially as described.

7. In a mechanical perforator for use with automatic telegraph-transmitters, the combination with a differential tape-feeding mechanism of a limiting-key, levers connecting same with the push-rod comb-plate on operation adapted to move said comb-plate whereby the spacing-hole is eliminated, and a sequence of undivided symbols obtained substantially as described.

8. In a perforator for use with automatic telegraph-transmitters, the combination of punching mechanism, tape-feed mechanism, a cam-shaft having means for controlling the punching mechanism and the tape-feed mechanism and having a spur-pinion thereon, a spring coiled by a prime mover and adapted by means of a spur-ring attached to the other end of said spring to drive said cam-pinion substantially as described.

9. In a perforator for use with automatic telegraph-transmitters, the combination with punching and tape-feed mechanism and a sprocketed star tape-feed wheel for feeding the tape, of an adjustably-tensioned top roller or shoe, said top roller or shoe holding the tape in connection with the feed-wheel substantially as described.

10. In combination in a perforating-machine, punching means, differential tape-feeding mechanism comprising a series of stop-feed pins, a series of parallel bars, combs for operating said bars, key connections to the combs and lever connections between the said parallel bars and the stop-feed pins, substantially as described.

11. In combination in a perforating-machine, punching means, tape-feeding means, check or stop-feed pins to give a differential action to the tape-feeding means and means for shifting part of the operating connection leading to the said check or stop-feed pins whereby the spacing-hole will be eliminated, substantially as described.

12. In combination in a perforating-machine, punching means, tape-feeding means, check or stop-feed pins to give a differential action to the tape-feeding means and an adjustable plate controlling the variable feed of the said tape-feeding means, said plate carrying and shifting part of the operating connection leading to the check or stop-feed pins, and a limiting-key connected with the adjustable plate, substantially as described.

13. In a perforator for use with automatic telegraphic transmitters and the like, the combination with a feed-shaft, of a lantern ratchet feed-wheel suitably secured thereon, a beam, a variable fulcrum therefor at one end, a pawl engaging the lantern-wheel and operatively connected with the other end of said beam, and means connected with the intermediate portion of said beam for lifting the same, substantially as described.

14. In a perforator for use with automatic telegraphic transmitters and the like, the combination with a feed-shaft, of a lantern ratchet feed-wheel suitably secured thereon, a beam located over said wheel, means for permitting a variable lifting movement to one end of said beam, a pawl operatively connected to the other end and engaging the lantern-wheel, means connected with the intermediate portion of said beam for lifting the same, and a tooth carried by said beam adapted to engage between the pins of the lantern-wheel when the beam is in its lowermost position, substantially as described.

15. In combination, a feed-shaft, a lantern ratchet-wheel thereon, a beam located over the lantern-wheel, means connected to said beam intermediate of its ends for lifting it, variable stop means for limiting the upward movement of one end of the beam and forming an adjustable fulcrum, a link depending from the other end of said beam, a pawl connected with said link and engaging the pins of the lantern-wheel, and guide-arms on each side of the lantern-wheel pivotally connected with the shaft and the said link, substantially as described.

16. In combination, a feed-shaft, a ratchet-wheel mounted thereon, a beam located above the ratchet-wheel, a reciprocating member pivotally connected to said beam intermediate of its ends for moving it vertically, variable stop means at one end of said beam for limiting the vertical movement thereof, a pawl connected with the opposite end and engaging the ratchet-wheel and a pawl carried upon a stationary pivot and also engaging the ratchet-wheel, substantially as described.

In testimony whereof I have hereto affixed my signature in presence of two witnesses.

JOHN GELL.

Witnesses:
FRANCIS HERON ROGERS,
J. PHILLIPS CRAWLEY.